United States Patent [19]
Wojciak

[11] Patent Number: 5,922,783
[45] Date of Patent: Jul. 13, 1999

[54] RADIATION-CURABLE, CYANOACRYLATE-CONTAINING COMPOSITIONS

[75] Inventor: Stan Wojciak, New Britian, Conn.

[73] Assignee: Loctite Corporation, Hartford, Conn.

[21] Appl. No.: 08/805,193

[22] Filed: Feb. 27, 1997

[51] Int. Cl.$^6$ ............................... C08J 4/04; C08F 2/50; C08F 4/42

[52] U.S. Cl. ............................... 522/18; 522/25; 522/28; 522/29; 522/20; 522/173; 526/170; 526/171; 526/172; 526/298; 156/275.5; 156/275.7

[58] Field of Search ............................... 522/29, 18, 20, 522/21, 28, 173, 25; 526/170, 171, 172, 298; 156/275.5, 275.7

[56] References Cited

U.S. PATENT DOCUMENTS

| | | | |
|---|---|---|---|
| Re. 32,889 | 3/1989 | Litke | 523/212 |
| 3,855,040 | 12/1974 | Malofsky | 156/310 |
| 4,102,945 | 7/1978 | Gleave | 260/879 |
| 4,105,715 | 8/1978 | Gleave | 260/881 |
| 4,440,910 | 4/1984 | O'Connor | 525/295 |
| 4,450,265 | 5/1984 | Harris | 526/298 |
| 4,525,232 | 6/1985 | Rooney | 156/273.3 |
| 4,533,446 | 8/1985 | Conway | 204/159.24 |
| 4,690,957 | 9/1987 | Fujiokau | 522/31 |
| 4,707,432 | 11/1987 | Gatechair | 430/281 |
| 5,525,698 | 6/1996 | Böttcher | 528/92 |
| 5,652,280 | 7/1997 | Kutal | 522/66 |
| 5,691,113 | 11/1997 | Kutal | 430/274.1 |
| 5,824,180 | 10/1998 | Mikuni | 156/275.3 |

FOREIGN PATENT DOCUMENTS

| | | | |
|---|---|---|---|
| 278 685 | 8/1988 | European Pat. Off. | B32B 27/16 |
| 393 407 | 3/1990 | European Pat. Off. | C09J 163/00 |
| WO 93/10483 | 5/1993 | WIPO | G03C 1/67 |

OTHER PUBLICATIONS

Mohammed Aslam, Q. Anwaruddin and L.V. Natarajan, "Photopolymerization of Vinyl Monomers Initiated by Diacidobis(ethylenediamine)cobalt (III) Complexes", *Polymer Photochemistry*, 5, 41–48 (1984).

James F. Cameron and Jean M. J. Fréchet, "Base Catalysis in Imaging Materials. 1. Design and Synthesis of Novel Light–Sensitive Urethanes as Photoprecursors of Amines", *J. Org. Chem.*, 55, 5919–22 (1990).

James F. Cameron and Jean M. J. Fréchet, "Photogeneration of Organic Bases from o–Nitrobenzyl–Derived Carbamates", *J. Am. Chem. Soc.*, 113, 4303–13 (1991).

Yoshihisa Fukuchi, Tamotsu Takahashi, Hiromichi Noguchi, Masahiko Saburi and Ysauzo Uchida, "Photoinitiated Anionic coordination Polymerization of Epoxides, a Novel Polymerization Process", *Macromolecules*, 20, 2316–17 (1987).

Charles Kutal and C. Grant Willson, "Photoinitiated Cross–Linking and Image Formation In Thin Polymer Films Containing a Transition Metal Compound", *Solid–State Science and Technology*, 134, 2280–85 (1987).

Charles Kutal, Scott K. Weit, Scott A. MacDonald and C. Grant Willson, "New Inorganic Photoinitiators for Deep–UV Resist Materials", *J. Coat. and Tech.*, 62, 63–67 (1990).

Charles Kutal and Scott K. Weit, "Novel Base–Generating Photoinitiators for Deep–UV Lithography", *Advances in Resist Technology and Processing VIII*, 1466, 362–67(1991).

G.H. Millet, "Cyanoacrylate Adhesives", *Structural Adhesives: Chemistry and Technology*, S. R. Hartshorn, ed., 249–307 (1986).

H.V. Coover, D.W. Dreifus and J.T. O'Connor, "Cyanoacrylate Adhesives" in *Handbook of Adhesives*, 27, 463–77, I. Skeist, ed., Van Nostrand Reinhold, New York, 3rd ed. (1990).

C. Kutal, P.A. Grutsch and D.B. Yang, "A Novel Strategy for Photoinitiated Anionic Polymerization", *Macromolecules*, 24, 6872–73 (1991).

J.G. Woods, "Radiation–Curable Adhesives" in *Radiation Curing: Science and Technology*, 333–98, 371, S.P. Pappas, ed., Plenum Press, New York (1992).

D.B. Yang and C. Kutal, "Inorganic and Organometallic Photoinitiators" in *Radiation Curing: Science and Technology*, 21–55, S.P. Pappas, ed., Plenum Press, New York (1992).

*Primary Examiner*—Susan W. Berman
*Attorney, Agent, or Firm*—Steven C. Bauman

[57] ABSTRACT

A radiation-curable composition which includes a cyanoacrylate component or a cyanoacrylate-containing formulation; a metallocene component; and a polymerizingly effective amount of a photoinitiator to accelerate the rate of cure is provided.

20 Claims, No Drawings

RADIATION-CURABLE, CYANOACRYLATE-CONTAINING COMPOSITIONS

BACKGROUND OF THE INVENTION

1. Field of the Invention

The present invention relates to a radiation-curable composition which includes a cyanoacrylate component or a cyanoacrylate-containing formulation, a metallocene component and a polymerizingly effective amount of a photoinitiator to accelerate the rate of cure.

2. Brief Description of Related Technology

Cyanoacrylates generally are quick setting materials which cure to clear, hard glassy resins, useful as sealants, coatings, and particularly adhesives for bonding together a variety of substrates [see e.g., H. V. Coover, D. W. Dreifus and J. T. O'Connor, "Cyanoacrylate Adhesives" in Handbook of Adhesives, 27, 463–77, I. Skeist, ed., Van Nostrand Reinhold, New York, 3rd ed. (1990)].

Ordinarily, upon contact with substrate materials possessing a surface nucleophile, cyanoacrylate-containing compositions spontaneously polymerize to form a cured material. The cured material exhibits excellent adhesive properties to materials such as metals, plastics, elastomers, fabrics, woods, ceramics and the like. Cyanoacrylate-containing compositions are thus seen as a versatile class of single-component, ambient temperature curing adhesives.

As noted, cyanoacrylate polymerization is typically initiated using a nucleophile. The cyanoacrylate anionic polymerization reaction proceeds until all available cyanoacrylate monomer has been consumed and/or terminated by an acidic species.

Although the predominant mechanism by which cyanoacrylate monomers undergo polymerization is an anionic one, free-radical polymerization is also known to occur in this regard under prolonged exposure to heat or light of an appropriate wavelength. See e.g., Coover et al., supra. Ordinarily, however, free-radical stabilizers, such as quinones or hindered phenols, are included in cyanoacrylate-containing adhesive formulations to extend their shelf life. Thus, the extent of any free-radical polymerization of commercial cyanoacrylate-containing compositions is typically minimal and in fact is especially undesirable for at least the reason stated.

With conventional polymerizable compositions other than those containing cyanoacrylate monomers, radiation cure generally presents certain advantages over other known cure methods. Those advantages include reduced cure time, solvent elimination (which thereby reduces environmental pollution, and conserves raw materials and energy) and inducement of low thermal stressing of substrate material. Also, room temperature radiation cure prevents degradation of certain heat sensitive polymers, which may occur during a thermal cure procedure.

Radiation-curable, resin-based compositions are legion for a variety of uses in diverse industries, such as coatings, printing, electronic, medical and general engineering. Commonly, radiation-curable compositions are used for adhesives, and in such use the resin may ordinarily be chosen from epoxy- or acrylate-based resins.

Well-known examples of radiation-curable, epoxy-based resins include cycloaliphatic and bisphenol-A epoxy resins, epoxidized novolacs and glycidyl polyethers. [See e.g., U.S. Pat. No. 4,690,957 (Fujiokau) and European Patent Publication EP 278 685.] The common cure mechanism for such radiation-curable epoxy-based compositions is reported to be cationic polymerization.

Well-known examples of radiation-curable, acrylate-based resins include those having structural backbones of urethanes, amides, imides, ethers, hydrocarbons, esters and siloxanes. [See e.g., J. G. Woods, "Radiation-Curable Adhesives" in *Radiation Curing: Science and Technology*, 333–98, 371, S. P. Pappas, ed., Plenum Press, New York (1992).] The common cure mechanism for such radiation-curable, acrylate-based compositions is free-radical polymerization.

European Patent Publication EP 393 407 describes a radiation-curable composition which includes a slow cure cationic polymerizable epoxide, a fast cure free radical polymerizable acrylic component and a photoinitiator. Upon exposure to radiation, the photoinitiator is said to be capable of generating a cationic species which is capable of initiating polymerization of the epoxide and a free radical species which is capable of initiating polymerization of the acrylic component. The polymerizable acrylic component includes monofunctional acrylates and acrylate esters, such as cyano-functionalized acrylates and acrylate esters, examples of which are expressed as 2-cyanoethyl acrylate ($CH_2=CHCOOCH_2CH_2CN$) and 3-cyanopropyl acrylate ($CH_2=CHCOOCH_2CH_2CH_2CN$). (See page 5, lines 19–26.) The photoinitiator includes onium salts of Group Va, VIa and VIIa as well as iron-arene complexes, and generally metallocene salts, provided that the material chosen as the photoinitiator is said to be one which is capable of generating both a cationic species and a free radical species upon exposure to radiation. (See page 5, line 56 page 7, line 15.)

Other reported information regarding photopolymerizable compositions includes formulations containing epoxy compounds and metal complexes, such as disclosed in U.S. Pat. No. 5,525,698 (Böttcher).

U.S. Pat. No. 4,707,432 (Gatechair) speaks to a free radical polymerizable composition which includes (a) polymerizable partial esters of epoxy resins and acrylic and/or methacrylic, and partial esters of polyols and acrylic acid and/or methacrylic acid, and (b) a photoinitiator blend of a cyclopentadienyl iron complex and a sensitizer or photoinitiator, such as an acetophenone.

In D. B. Yang and C. Kutal, "Inorganic and Organometallic Photoinitiators" in *Radiation Curing: Science and Technology*, 21–55, S. P. Pappas, ed., Plenum Press, New York (1992), cyclopentadienyl transition metal complexes are discussed with attention paid to ferrocene and titanocene. In the absence of halogenated media, Yana and Kutal report that ferrocene is photoinert, though in the presence of such media and a vinyllic source free radical initiated polymerization may occur.

And in C. Kutal, P. A. Grutsch and D. B. Yang, "A Novel Strategy for Photoinitiated Anionic Polymerization", *Macromolecules*, 24, 6872–73 (1991), the authors note that "[c]onspicuously absent from the current catalogue of photoinitiators are those that undergo photochemical release of an anionic initiating species." The authors also note that ethyl cyanoacrylate is "unaffected by prolonged (24-h) irradiation with light of wavelength >350 nm" whereas in the presence of NCS⁻, cyanoacrylate is observed to solidify immediately, generating heat in the process. Though the NCS⁻ was not in that case generated as a result of irradiation, it was generated from the Reineckate anion upon ligand field excitation thereof with near-ultraviolet/visible light.

While metallocenes (such as ferrocenes) have been employed in acrylate-based anaerobic adhesive compositions [see e.g., U.S. Pat. Nos. 3,855,040 (Malofsky), 4,525, 232 (Rooney), 4,533,446 (Conway) and EP '407], it is not believed that to date a cyanoacrylate-based adhesive composition has been developed including therein a metallocene at all, particularly with respect to curing through a photo-initiated mechanism.

Accordingly, a photocurable composition including a cyanoacrylate component, a metallocene component and a photoinitiator component would be desirable as possessing the benefits and advantages of cyanoacrylate-containing compositions while curing through at least a photo-induced polymerization mechanism.

SUMMARY OF THE INVENTION

The present invention meets the desire expressed above by providing compositions which include a cyanoacrylate component or a cyanoacrylate-containing formulation, a metallocene component and a photoinitiator. Desirably, such compositions are curable after exposure to radiation in the electromagnetic spectrum. Accordingly, in such radiation or photocurable compositions a polymerizingly effective amount of a photoinitiator should be used.

The photocurable compositions of this invention retain those benefits and advantages of traditional cyanoacrylate-containing compositions while curing through at least a photo-induced polymerization mechanism, thereby providing to the compositions (and cured reaction products formed therefrom) the benefits and advantages of curing through such a mechanism. More specifically, photocurable compositions according to this invention cure rapidly, and in so doing minimize the opportunity for undesirable blooming or crazing formation in the cured reaction product.

In another aspect of the present invention, there is provided a method of polymerizing a photocurable composition by providing an amount of the composition to a desired surface and exposing the composition to radiation in an amount sufficient to effect cure thereof.

In yet another aspect of the present invention, there is provided the cured reaction product formed from a photocurable composition after exposure thereof to a curingly effective amount of radiation.

The present invention will be more readily appreciated by those persons of skill in the art based on a reading of the detailed description of the invention which follows and the examples presented thereafter for illustrative purposes.

DETAILED DESCRIPTION OF THE INVENTION

This invention relates to photocurable compositions which include a cyanoacrylate component or a cyanoacrylate-containing formulation, a metallocene component and a polymerizingly effective amount of a photoinitiator.

The cyanoacrylate component or cyanoacrylate-containing formulation includes cyanoacrylate monomers which may be chosen with a raft of substituents, such as those represented by $H_2C=C(CN)-COOR$, where R is selected from $C_{1-15}$ alkyl, alkoxyalkyl, cycloalkyl, alkenyl, aralkyl, aryl, allyl and haloalkyl groups. Desirably, the cyanoacrylate monomer is selected from methyl cyanoacrylate, 2-ethyl cyanoacrylate, 2-propyl cyanoacrylate, 2-butyl cyanoacrylate, 2-octyl cyanoacrylate, allyl cyanoacrylate, β-methoxyethyl cyanoacrylate and combinations thereof. A particularly desirable cyanoacrylate monomer for use herein is 2-ethyl cyanoacrylate.

A variety of organometallic materials are also suitable for use herein. Those materials of particular interest herein may be represented by metallocenes within the following structure:

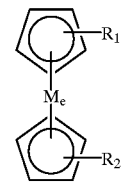

where $R_1$ and $R_2$ may be the same or different, and each may be selected from H; any straight- or branched-chain alkyl constituent having from 1 to about 8 carbon atoms, such as $CH_3$, $CH_2CH_3$, $CH_2CH_2CH_3$, $CH(CH_3)_2$, $C(CH_3)_3$ or the like; acetyl; vinyl; allyl; hydroxyl; carboxyl; $-(CH_2)_n-$ OH, where n may be an integer in the range of 1 to about 8; $-(CH_2)_n-COOR_3$, where n may be an integer in the range of 1 to about 8 and $R_3$ may be any straight- or branched-chain alkyl constituent having from 1 to about 8 carbon atoms; H; Li; Na; or $-(CH_2)_{n'}$, where n' may be an integer in the range of 2 to about 8; $-(CH_2)_n-OR_4$, wherein n may be an integer in the range of 1 to about 8 and $R_4$ may be any straight- or branched-chain alkyl constituent having from 1 to about 8 carbon atoms; or $-(CH_2)_n-N^+(CH_3)_3 \, X^-$, where n may be an integer in the range of 1 to about 8 and X may be $Cl^-$, $Br^-$, $I^-$, $ClO_4^-$ or $BF_4^-$; and $M_e$ is Fe, Ti, Ru, Co, Ni, Cr, Zr, Hf, Mo or the like. Of course, depending on valence state, the element represented by $M_e$ may have additional ligands associated therewith beyond the cyclopentadienyl ligands depicted above.

Desirably, the metallocene is selected from ferrocenes (i.e., where $M_e$ is Fe), such as vinyl ferrocenes or butyl ferrocenes, titanocenes (i.e., where $M_e$ is Ti), such as bis ($\eta^5$-2,4-cyclopentadien-1-yl)-bis-[2,6-difluoro-3-(1H-pyrrol-1-yl)phenyl] titanium which is available commercially from Ciba-Geigy Corporation, Tarrytown, N.Y. under the tradename "IRGACURE" 784DC, and derivatives and combinations thereof. A particularly desirable metallocene is ferrocene.

A number of photoinitiators may be employed herein to provide the benefits and advantages of the present invention to which reference is made above. Of course, certain metallocenes, such as "IRGACURE" 784DC, may serve a dual purpose as both metallocene and photoinitiator. Photoinitiators enhance the rapidity of the curing process when the photocurable compositions as a whole are exposed to electromagnetic radiation.

Such materials include, but are not limited to, photoinitiators available commercially from Ciba-Geigy Corp., Tarrytown, N.Y. under the "IRGACURE" and "DAROCUR" tradenames, specifically "IRGACURE" 184 (1-hydroxycyclohexyl phenyl ketone), 907 (2-methyl-1-[4-(methylthio)phenyl]-2-morpholino propan-1-one), 369 (2-benzyl-2-N,N-dimethylamino-1-(4-morpholinophenyl)-1-butanone), 500 (the combination of 1-hydroxy cyclohexyl phenyl ketone and benzophenone), 651 (2,2-dimethoxy-2-phenyl acetophenone), 1700 (the combination of bis(2,6-dimethoxybenzoyl-2,4-,4-trimethyl pentyl phosphine oxide and 2-hydroxy-2-methyl-1-phenyl-propan-1-one) and "DAROCUR" 1173 (2-hydroxy-2-methyl-1phenyl-1-propane) and 4265 (the combination of 2,4, 6trimethylbenzoyldiphenyl-phosphine oxide and 2-hydroxy 2-methyl-1-phenyl-propan-1-one); photoinitiators available commercially from Union Carbide Chemicals and Plastics Co. Inc., Danbury, Conn. under the "CYRACURE" tradename, such as "CYRACURE" UVI-6974 (mixed triaryl sulfonium hexafluoroantimonate salts) and UVI-6990 (mixed triaryl sulfonium hexafluorophosphate salts); and the visible light [blue] photoinitiators, dl-camphorquinone and "IRGACURE" 784DC. Of course, combinations of these materials may also be employed herein.

Photoinitiators particularly suitable for use herein include ultraviolet photoinitiators, such as 2,2-dimethoxy-2-phenyl acetophenone (e.g., "IRGACURE" 651), and 2-hydroxy-2-methyl-1-phenyl-1-propane (e.g., "DAROCUR" 1173) and the ultraviolet/visible photoinitiator combination of bis(2,6-dimethoxybenzoyl-2,4-,4-trimethylpentyl phosphine oxide and 2-hydroxy-2-methyl-1-phenyl-propan-1-one (e.g., "IRGACURE" 1700), as well as the visible photoinitiator bis ($\eta^5$-2,4-cyclopentadien-1-yl)-bis [2, 6-difluoro-3-(1H-pyrrol-1-yl)phenyl]titanium (e.g., "IRGACURE" 784DC).

With respect to formulating photocurable compositions, generally the components may be introduced to one another in any convenient order. Alternatively, it may be desirable to prepare a premix of the metallocene component and the photoinitiator component. In this way, a ready made premix of those components may be added to the cyanoacrylate component of the formulation to allow for a quick and easy one-part formulation of a photocurable composition prior to dispensing and curing thereof.

For packaging and dispensing purposes, it may be desirable for photocurable compositions in accordance with the present invention to be relatively fluid and flowable. Variations in the viscosity thereof may also be desirable in certain applications and may be readily achieved through routine changes in formulation.

For instance, ordinarily cyanoacrylate-containing compositions free from an added thickener or viscosity modifier are low viscosity formulations (such as in the range of 1 to 3 cps) which may be too low for convenient use in certain industrial applications. At least for this reason, the viscosity of cyanoacrylate-containing compositions has at times been desirably modified through, for instance, the addition of polymethylmethacrylates and/or fumed silicas. See e.g., U.S. Pat. Nos. 4,533,422 (Litke) and Re. 32,889 (Litke), the disclosures of each of which are hereby expressly incorporated herein by reference.

In addition, it may be desirable to toughen the cured photocurable compositions of the present invention through the addition of elastomeric rubbers such as is taught by and claimed in U.S. Pat. No. 4,440,910 (O'Connor), the disclosure of which is hereby expressly incorporated herein by reference. It may also be desirable to improve the hot strength of the cured photocurable compositions by addition of anhydrides, such as is taught by and claimed in U.S. Pat. No. 4,450,265 (Harris) and the documents cited therein, the disclosures of each of which are hereby expressly incorporated herein by reference.

Moreover, the compositions of the present invention may be rendered into a thixotropic paste through addition of powdered organic fillers having a particle size of about 2 to 200 microns as is taught by U.S. Pat. No. 4,105,715 (Gleave) or thickened by a copolymer or terpolymer resin to improve peel strength as is taught by U.S. Pat. No. 4,102,945 (Gleave), the disclosures of each of which are hereby incorporated herein by reference.

The inclusion of such materials to a photocurable composition in accordance with the present invention may provide a formulation having particular advantages for certain applications, and should be appealing from a safety perspective as the possibility is decreased of splashing or spilling the composition on exposed skin of the user or bystanders.

The relative amount of the various components of the photocurable compositions according to this invention is a matter of choice left to those persons of skill in the art, depending of course on the identity of the particular components chosen for a specific composition. As a general guide, however, it is desirable to include in the photocurable compositions a metallocene, such as ferrocene, in an amount within the range of about 0.005% to about 4% or greater (desirably within the range of about 0.01% to about 1.5%) by weight of the total composition. It is also desirable for the compositions to include a photoinitiator, such as "IRGACURE" 1173 or 1700, in an amount within the range of about 0.5% to about 10% by weight of the composition, with about 2% to about 4% or greater by weight of the total composition being desirable. The balance of the composition is composed predominantly of a cyanoacrylate component, such as 2-ethyl cyanoacrylate. Of course, the amount of all the components together in the composition totals 100%.

A method of curing a photocurable composition in accordance with this invention is also provided herein, the steps of which include (a) providing onto a desired surface an amount of a photocurable composition; and (b) subjecting the composition to radiation sufficient to effect cure thereof.

The amount of photocurable composition provided should be sufficient to cure and form an adequate bond to the substrate surfaces between which it is applied. For instance, application of the photocurable composition may be achieved by dispensing the composition in drop-wise fashion, or as a liquid stream, brush-applied, dipping, and the like, to form a thin film. Application of the photocurable composition may depend on the flowability or viscosity of the composition. To that end, viscosity modifiers, as noted above, may be included in the composition.

In use, such compositions are desirably readily dispensed onto a portion of a desired surface of a substrate onto which is to be bonded a portion of another substrate. The photocurable composition may be applied to certain portions of the substrate surface or over the entire surface of the substrate to be bonded, depending on the particular application.

The source of radiation emitting electromagnetic waves is selected from ultraviolet light, visible light, electron beam, x-rays, infrared radiation and combinations thereof. Desirably, ultraviolet light is the radiation of choice, with appropriate sources including "H", "D", "V", "X", "M" and "A" lamps, mercury arc lamps, and xenon arc lamps (such as those commercially available from Loctite Corporation, Rocky Hill, Conn., Fusion UV Curing Systems, Buffalo Grove, Ill. or Spectroline, Westbury, N.Y.); microwave-generated ultraviolet radiation; solar power and fluorescent light sources. Any of these electromagnetic radiation sources may use in conjunction therewith reflectors and/or filters, so as to focus the emitted radiation onto a specific portion of a substrate onto which has been dispensed a photocurable composition and/or within a particular region of the electromagnetic spectrum. Similarly, the electromagnetic radiation may be generated directly in a steady fashion or in an intermittent fashion so as to minimize the degree of heat build-up. Although the electromagnetic radiation employed to cure the photocurable compositions into desired reaction products is often referred to herein as being in the ultraviolet region, that is not to say that other radiation within the electromagnetic spectrum may not also be suitable. For instance, in certain situations, radiation in the visible region of the electromagnetic spectrum may also be advantageously employed, whether alone or in combination with, for instance, radiation in the ultraviolet region. Of course, microwave and infrared radiation may also be advantageously employed under appropriate conditions.

Higher or lower radiation intensities, greater or fewer exposures thereto and length of exposure and/or greater or lesser distances of the source of radiation to the composition may be required to complete curing, depending of course on the particular components of a chosen composition.

More specifically with respect to radiation intensity, the chosen lamp should have a power rating of at least about 100 watts per inch (about 40 watts per cm), with a power rating of at least about 300 watts per inch (about 120 watts per cm) being particularly desirable. Also, since the inclusion of a photoinitiator in the composition may shift the wavelength within the electromagnetic radiation spectrum at which cure occurs, it may be desirable to use a source of electromagnetic radiation whose variables (e.g., wavelength, distance, and the like) are readily adjustable.

During the curing process, the composition will be exposed to a source of electromagnetic radiation that emits an amount of energy, measured in $KJ/m^2$, determined by parameters including: the size, type and geometry of the source; the duration of the exposure to electromagnetic radiation; the intensity of the radiation (and that portion of radiation emitted within the region appropriate to effect curing); the absorbency of electromagnetic radiation by any intervening materials, such as substrates; and the distance the composition lies from the source of radiation. Those persons of skill in the art should readily appreciate that curing of the composition may be optimized by choosing appropriate values for these parameters in view of the particular components of the composition.

To effect cure, the source of electromagnetic radiation may remain stationary while the composition passes through its path. Alternatively, a substrate coated with the photocurable composition may remain stationary while the source of electromagnetic radiation passes thereover or therearound to complete the transformation from composition to reaction product. Still alternatively, both may traverse one another, or for that matter remain stationary, provided that the photocurable composition is exposed to electromagnetic radiation sufficient to effect cure.

Commercially available curing systems, such as the "ZETA" 7200 or 7400 ultraviolet curing chamber (Loctite Corporation, Rocky Hill, Conn.), Fusion UV Curing Systems F-300 B (Fusion UV Curing Systems, Buffalo Grove, Ill.), Hanovia UV Curing System (Hanovia Corp., Newark, N.J.), BlackLight Model B-100 (Spectroline, Westbury, N.Y.) and RC500 A Pulsed UV Curing System (Xenon Corp., Woburn, Mass.), are well-suited for the purposes described herein. Also, a Sunlighter UV chamber fitted with low intensity mercury vapor lamps and a turntable may be employed herein.

The required amount of energy may be delivered by exposing the composition to a less powerful source of electromagnetic radiation for a longer period of time, through for example multiple passes, or alternatively, by exposing the composition to a more powerful source of electromagnetic radiation for a shorter period of time. In addition, each of those multiple passes may occur with a source at different energy intensities. In any event, those persons of skill in the art should choose an appropriate source of electromagnetic radiation depending on the particular composition, and position that source at a suitable distance therefrom which, together with the length of exposure, optimizes transformation. Also, it may be desirable to use a source of electromagnetic radiation that is delivered in an intermittent fashion, such as by pulsing or strobing, so as to ensure a thorough and complete cure without causing excessive heat build-up.

In use, a photocurable composition in accordance with the present invention may be dispensed, such as in the form of a thin film or droplet, onto a desired substrate. Substrates onto which the photocurable composition of the present invention may be applied may be chosen from a vast selection of different materials; basically, any material with which cyanoacrylates may be used is suitable as well for use herein. See supra.

Desirable choices among such materials include acrylics, epoxies, polyolefins, polycarbonates, polysulfones (e.g., polyether sulfone), polyvinyl acetates, polyamides, polyetherimides, polyimides and derivatives and co-polymers thereof with which may be blended or compounded traditional additives for aiding processibility or modifying the physical properties and characteristics of the material to be used as a substrate. Examples of co-polymers which may be employed as substrates include acrylonitrile-butadiene-styrene, styrene-acrylonitrile cellulose, aromatic copolyesters based on terephthallic acid, p,p-dihydroxybiphenyl and p-hydroxy benzoic acid, polyalkylene (such as polybutylene or polyethylene) terephthalate, polymethyl pentene, polyphenylene oxide or sulfide, polystyrene, polyurethane, polyvinylchloride, and the like. Of course, other materials may also be employed for use herein. Particularly, desirable co-polymers include those which are capable of transmitting UV and/or visible radiation.

The composition-coated substrate may be positioned within an electromagnetic radiation curing apparatus, such as the "ZETA" 7200 ultraviolet curing chamber, equipped with an appropriate source of electromagnetic radiation, such as ultraviolet radiation, at an appropriate distance therefrom, such as within the range of about 1 to 2 inches, with about 3 inches being desirable. As noted above, the composition-coated substrate may remain in position or may be passed thereunder at an appropriate rate, such as within the range of about 1 to about 60 seconds per foot, with about 5 seconds per foot. Such passage may occur one or more times, or as needed to effect cure of the composition on the substrate. The length of exposure may be in the range of a few seconds or less (for one time exposure) to tens of seconds or longer (for either a one time exposure or a multiple pass exposure) if desired, depending on the depth of the composition to be cured and of course on the components of the composition themselves.

A reaction product is also of course provided by the teaching of this invention. The reaction product is formed from photocurable compositions after exposure thereof to electromagnetic radiation sufficient to effect cure of the composition. The reaction product is formed rapidly, and ordinarily and desirably without observed formation of blooming or crazing, see infra.

The reaction product of the photocurable composition may be prepared by dispensing in low viscosity or liquid form a photocurable composition in accordance with present invention onto a substrate and mating that substrate with a second substrate to form an assembly. Thereafter, exposure to electromagnetic radiation on at least one substrate of the assembly for an appropriate period of time should transform the photocurable composition into an adhesive reaction product.

It is also within the scope of the present invention for reaction products to be prepared from a photocurable composition separately from the device, and thereafter positioned on a substrate surface with which it is to be used. In this manner, such reaction products may desirably be fabricated, for instance, into a film or tape, such as an adhesive film or a coating film, which when applied to a chosen substrate will bond thereto. Many known film manufacturing processes may be employed to manufacture into films photocurable compositions in accordance with the present invention, including calendaring, casting, rolling, dispensing, coating, extrusion and thermoforming. For a non-exhaustive description of such processes, see Modern Plastics Encyclopedia 1988, 203–300, McGraw-Hill Inc., New York (1988). With respect to dispensing or coating, conventional techniques, such as curtain coating, spray coating, dip coating, spin coating, roller coating, brush coating or transfer coating, may be used.

A film of the photocurable composition may be prepared by extrusion or calendaring, where cure occurs by exposure to electromagnetic radiation prior to, contemporaneously with, or, if the composition is sufficiently viscous, after passing through the extruder or calendar. Thereafter, the film may be placed between the desired substrates, and construction of the device may be completed.

The viscosity of the photocurable composition may be controlled or modified to optimize its dispensability by, in addition to inclusion of an appropriate material to alter the viscosity thereof as noted above, adjusting the temperature of (1) the composition itself, or (2) the substrates on which the composition may be placed to assemble the device. For example, the temperature of the composition or the substrate (s) or combinations thereof may be decreased to increase the viscosity of the composition. In this way, the uniformity on the substrate of the dispensed photocurable composition may be enhanced using lamination techniques, centrifuge techniques, pressure applied from the atmosphere (such as with vacuum bagging), pressure applied from a weighted object, rollers and the like.

The substrates onto which the photocurable compositions of the present invention are intended to be dispensed may be constructed from the litany of materials recited supra, which may be substantially inflexible as well as flexible. The type of substrate chosen with respect to flexibility will of course depend on the application for which it is to be used. More specifically, the substrates may be constructed from substantially inflexible materials, such as glass, laminated glass, tempered glass, optical plastics, such as polycarbonates, acrylics and polystyrenes, and other alternatives as noted supra; and flexible materials, such as "MYLAR" film or polyolefin, such as polyethylene or polypropylene, tubing.

The choice of substrate material may influence the choice of processing technique used to prepare the photocurable composition into the cured reaction product or the type of device assembled. For example, when assembling a device from at least one flexible substrate, a composition may be advantageously applied to an end portion of the flexible substrate and allowed to wick along that end portion through a portion of another substrate, which is dimensioned to receive that end portion of the flexible substrate. A particular example of such an application is polyolefin tubing intended for medical application, one end portion of which is dimensioned for receiving by an acrylic luer housing.

In addition, roll-to-roll systems may be employed where flexible substrates are released from rolls (that are aligned and rotate in directions opposite to one another), and brought toward one another in a spaced-apart relationship. In this way, the photocurable composition may be dispensed or injected onto one of the flexible substrates at a point where the two flexible substrates are released from their respective rolls and brought toward one another, while being contemporaneously exposed to electromagnetic radiation for a time sufficient to cure the composition into an adhesive reaction product.

The dispensing of the composition may be effected through an injection nozzle positioned over one of the rolls of flexible substrate. By passing in the path of the nozzle as a continuously moving ribbon, a flexible substrate may be contacted with the composition in an appropriate amount and positioned on the flexible substrate.

Since the photocurable compositions of the present invention cure to form reaction products through, as their description connotes, a photo-initiated mechanism, the composition and the surface of the substrate on which the composition is placed should be exposed to the source of electromagnetic radiation. The choice of substrate may affect the rate and degree at which cure occurs of the photocurable compositions of the present invention. For instance, it is desirable for the substrates to be bonded together to be substantially free of electromagnetic radiation-absorbing capabilities. That is, the greater degree of electromagnetic radiation transmitting capability the substrate possesses, the greater the rate and degree of cure of the composition, all else being equal of course.

Blooming or crazing may be observed when compositions cure into reaction products and the cure itself is incomplete. That is, blooming refers to the evaporation of cyanoacrylate monomer (due to its relatively high vapor pressure) from uncured fillets, the result of which is formation of a precipitate on surfaces adjacent to the bond line which are also observed as a white haze. Crazing refers to the formation of stress cracks on certain synthetic materials, such as polycarbonates, acrylics and polysulfones, due in this instance to the presence thereon of cyanoacrylate monomer.

The result of incomplete curing may be observed with respect to adhesive uses of the photocurable composition as adhesive or cohesive failure of the cured composition when applied to or between substrates. Such observations may be minimized or even eliminated by using electromagnetic radiation transmitting (as contrasted to absorbing) substrates and placing the source of electromagnetic radiation at a strategic location so as to improve the degree of electromagnetic radiation to which the composition on the substrate is exposed. Similarly, additional sources of electromagnetic radiation, or as stated above reflectors which redirect onto desired portions of the substrate stray or errant electromagnetic radiation, may be employed to further enhance cure.

In view of the above description of the present invention, it is evident that a wide range of practical opportunities is provided by the teaching herein. Certain of those practical opportunities are exemplified below, as are many of the advantages and benefits of the present invention. However, the invention as so exemplified is for illustrative purposes only and is not to be construed in any way as limiting the broad aspects of the teaching herein provided.

EXAMPLES

Example 1

A photocurable composition in accordance with the present invention was prepared from about 95.9 grams of 2-ethyl cyanoacrylate, about 0.1 grams of ferrocene and about 4 grams of "DAROCUR" 1173 as a photoinitiator. Typically, commercially available cyanoacrylate-containing compositions (such as "PRISM" Adhesive 4061, commercially available from Loctite Corporation, Rocky Hill, Conn.) are stabilized against free-radical formation by the addition of an acidic material, such as boron trifluoride or methane sulfonic acid. In this example, therefore, the ethyl cyanoacrylate contained about 20 ppm of boron trifluoride as an acid anionic stabilizer. Of course, greater or lesser amounts of boron triflouride or other acidic anionic stabilizers may be added for such purpose.

In one instance, the three components were added directly to a polyethylene vessel and mixed for a period of time of about thirty minutes at room temperature. In another instance, the cyanoacrylate was added to the polyethylene vessel, and thereafter a premix of the ferrocene in the "DAROCUR" photoinitiator was added to the cyanoacrylate already in the vessel. Mixing in this latter instance was also allowed to continue for a period of time of about thirty minutes at room temperature.

Once the photocurable composition was prepared, a drop or bead (about 0.2 grams) thereof was dispensed using a polyethylene pipet onto an ultraviolet transmitting acrylic substrate (whose dimensions were about 1×1×0.25 inches, such as those available commercially from Industrial Safety Co.). More specifically, the composition was applied to one end portion of a substrate and thereafter a second substrate (each of which being constructed from the same material and having the same dimensions) was placed in a laterally displaced, offset position with respect thereto so as to cover that portion of the first substrate onto which the composition was placed. This application was performed in triplicate.

The two substrates were then clamped together using a small alligator clamp to form a test piece assembly, and thereafter introduced into a "ZETA" 7200 ultraviolet curing chamber, equipped with a five inch medium pressure mercury arc lamp (emitting light of a wavelength of about 300 to 365 nm). The clamped assembly was placed in the chamber under the lamp at a distance of about 2 to 3 inches, and exposed to the ultraviolet light emitted by the lamp for a period of time of from about five to about fifteen seconds as reflected below in Table 1.

After the indicated exposure time, the once-liquid composition was observed to have cured into a solid reaction product. The thickness of the cured material, or the bond line, was measured and determined to be about 1–3 mil. The data presented below in Table 1 reflects values obtained after a period of time of about 24 hours at ambient temperature conditions prior to testing.

Shear strength tests in accordance with the protocol set forth in ASTM D-1002 were performed on the cured test piece using an Instron Universal tester (Model 4206, Instron, Canton, Mass.). The Instron tester was used to measure the force required to separate those test pieces from one another. Instron measurements, commonly in the range of about 2500 to about 5000 psi, were obtained. The force measured translates into the bond strength of the cured reaction product, expressed in terms of pounds per square inch ("psi").

The limiting feature of the cured composition of the present invention appears to be the strength of the substrate on which it is applied and cured. The average measurements from the three test piece assembly specimens are presented below in Table 1.

The data presented for Sample Nos. 1–3 in Table 1 reflect compositions which were subjected to varying initial exposures to electromagnetic radiation and the shear strengths demonstrated by the reaction product as a result after a period of time of about 24 hours prior to Instron testing. A second photocurable composition in accordance with the present invention was prepared in the same manner with about 2 grams of "IRGACURE" 651 as a replacement for the "DAROCUR" photoinitiator, with the balance of the composition coming from additional "PRISM" Adhesive. Sample Nos. 4–6 in Table 1 reflect this second composition which were subjected to the indicated varying initial exposures to electromagnetic radiation.

TABLE 1

| Sample No. | Radiation Exposure (secs) | Shear Strength (after 24 hrs, psi) |
|---|---|---|
| 1 | 5 | 4,057 |
| 2 | 10 | 3,835 |
| 3 | 15 | 4,846 |
| 4 | 5 | 4,984 |
| 5 | 10 | 4,293 |
| 6 | 15 | 3,062 |

Tables 2a and 2b below are to be construed together and set forth several other photocurable composition formulations in accordance with the present invention prepared from "PRISM" Adhesive 4061 cyanoacrylate and 0.1% by weight ferrocene with the listed photoinitiators and amounts thereof, the cure process employed and certain properties and characteristics of the reaction products formed therefrom. Each of these formulations (i.e., Sample Nos. 7–10) were allowed to cure completely for a period of time of about 24 hours after initial exposure to ultraviolet light. The shear strength of the reaction products formed from those cured formulations is represented in Table 2b.

TABLE 2a

| Sample No. | Photoinitiator Type | Amt. | Rad. Cure Type | Rad. Exp. (secs) |
|---|---|---|---|---|
| 7 | "DAROCUR" 1173 | 4% | UV | 10 |
| 8 | "IRGACURE" 651 | 2% | UV | 5 |
| 9 | "IRGACURE" 1700 | 2% | UV/VIS | 2 |
| 10 | "PRISM" Adh. 4061 (control) | — | — | — |

TABLE 2b

| | Shear Strength (psi) | | | |
|---|---|---|---|---|
| | after 1–3 min Substrate Type | | after 24 hours Substrate Type | |
| Sample No. | UV trans | UV abs | UV trans | UV abs |
| 7 | 3,152 | 926 | 3,591 | 2,800 |
| 8 | 3,352 | 1,208 | 3,021 | 3,000 |
| 9 | 3,292 | 2,672 | 3,292 | 3,198 |
| 10 | 42 | 147 | 1,724 | 2,624 |

In Table 2b, the shear strength was measured after exposure to electromagnetic radiation after a period of time of about 1 to about 3 minutes had elapsed and then again after a period of time of about 24 hours at ambient temperature conditions. Plainly, the shear strength measurements from the test piece assemblies constructed with the composition containing the "IRGACURE" 1700 photoinitiator (Sample No. 9) demonstrated a relatively small difference between test piece assemblies constructed from UV transmitting and UV absorbing substrates. And the shear strength measurements from test piece assemblies constructed with the UV absorbing substrates and the composition containing the "IRGACURE" 1700 photoinitiator was superior to that measured from the compositions containing either of the other two photoinitiators—"DAROCUR" 1173 (Sample No. 7) or "IRGACURE" 651 (Sample No. 8)—after the 1–3 minute time period indicated above. However, after a cure of about 24 hours, the measurements from each of the test piece assemblies constructed from UV transmitting or UV absorbing substrates and from each of the above-listed photoinitiators were all substantially within the same range, which was well above that of the control—"PRISM" Adhesive 4061 (Sample No. 10).

Example 2

In this example, a photoinitiator was used in the formulation which is capable of initiating polymerization irrespective of whether the substrate used is constructed from a UV transmitting material or a UV absorbing material. That is, the photoinitiator may be initiated by radiation in the visible region of the electromagnetic spectrum.

More specifically, three formulations were prepared from "PRISM" Adhesive 4061 together with about 0.1% by weight of ferrocene and about 0.5% by weight to about 2% by weight of "IRGACURE" 1700, as a photoinitiator. The amount of "PRISM" Adhesive 4061 (containing 2-ethyl cyanoacrylate) chosen is within the range of about 97.9% by weight to about 99.4% by weight of the composition. A fourth formulation consisted only of the "PRISM" Adhesive 4061 and was used as a control.

The formulations were prepared and applied to "s/p" micro slides (commercially available from Baxter Corporation, Deerfield, Ill.), which were then positioned in the "ZETA" 7200 UV curing chamber. The formulations were each observed to cure on the glass slides in a time period of about 2 to 3 seconds.

The formulations were then applied to acrylic substrates, both of the UV absorbing and the UV transmitting type. The formulations were applied to two sets of test piece specimens in triplicate of both UV absorbing acrylic substrates and UV transmitting acrylic substrates, which were mated to form test piece assemblies. The so-formed assemblies were then positioned in the UV curing chamber and exposed to UV radiation for the following time periods: about 1, 2 and 5 seconds. Thereafter, the test piece assemblies were maintained at ambient temperature conditions for a period of time of about 1 to 3 minutes and shear strength measurements of each test piece assembly were determined using the Instron Universal tester, as described in Example 1, supra. The second set of triplicate specimens was allowed to cure further at ambient temperature conditions for a period of time of about 24 hours. Failure in these specimens may occur due either substrate failure (e.g., substrate fracture), cohesive failure (e.g., where a portion of the photocurable composition separates due to the applied force on surfaces of both substrates) or adhesive failure (e.g., where the composition separates due to the applied force on a surface of one substrate).

The first formulation contained about 2% by weight of "IRGACURE" 1700, and the UV transmitting test piece which was exposed to UV radiation for 1 second demonstrated a shear strength of about 2552 psi with adhesive and cohesive failure; the corresponding UV absorbing test piece assembly demonstrated a shear strength of about 864 psi with cohesive failure. The UV transmitting test piece which was exposed to UV radiation for 2 seconds demonstrated a shear strength of about 3292 psi with adhesive and substrate failure; the corresponding UV absorbing test piece demonstrated a shear strength of about 2672 psi with adhesive and substrate failure. The UV transmitting test piece which was exposed to UV radiation for 5 seconds demonstrated a shear strength of about 2910 psi with adhesive failure; the corresponding UV absorbing test piece demonstrated a shear strength of about 1698 psi with adhesive and substrate failure.

The UV transmitting test piece which was exposed to UV radiation for 1 second and thereafter allowed to cure further for 24 hours demonstrated a shear strength of about 2572 psi with adhesive failure; the corresponding UV absorbing test piece assembly demonstrated a shear strength of about 2466 psi with adhesive failure. The UV transmitting test piece which was exposed to UV radiation for 2 seconds and thereafter allowed to cure further for 24 hours was observed to not change with respect to shear strength; the corresponding UV absorbing test piece demonstrated a shear strength of about 3198 psi with substrate failure. The UV transmitting test piece which was exposed to UV radiation for 5 seconds and thereafter allowed to cure further for 24 hours demonstrated a shear strength of about 3812 psi with substrate failure; the corresponding UV absorbing test piece demonstrated a shear strength of about 3502 psi with substrate failure.

The second formulation contained about 1% by weight of "IRGACURE" 1700, and the UV transmitting test piece which was exposed to UV radiation for 1 second demonstrated a shear strength of about 1272 psi with adhesive failure; the corresponding UV absorbing test piece assembly demonstrated a shear strength of about 430 psi with cohesive failure. The UV transmitting test piece which was exposed to UV radiation 2 seconds demonstrated a shear strength of about 2808 psi with adhesive and cohesive failure; the corresponding UV absorbing test piece demonstrated a shear strength of about 2334 psi with adhesive and substrate failure. The UV transmitting test piece which was exposed to UV radiation for 5 seconds demonstrated a shear strength of about 2208 psi with adhesive failure; the corresponding UV absorbing test piece demonstrated a shear strength of about 1832 psi with adhesive and cohesive failure.

The UV transmitting test piece which was exposed to UV radiation for 1 second and thereafter allowed to further cure for 24 hours demonstrated a shear strength of about 2828 psi with adhesive and substrate failure; the corresponding UV absorbing test piece assembly demonstrated a shear strength of about 1742 psi with cohesive failure. The UV transmitting test piece which was exposed to UV radiation 2 seconds and thereafter allowed to cure further for 24 hours demonstrated a shear strength of about 2808 psi with adhesive and cohesive failure; the corresponding UV absorbing test piece demonstrated a shear strength of about 2538 psi with adhesive and substrate failure. The UV transmitting test piece which was exposed to UV radiation for 5 seconds and thereafter allowed to cure further for 24 hours demonstrated a shear strength of about 2004 psi with cohesive failure; the corresponding UV absorbing test piece demonstrated a shear strength of about 3524 psi with substrate failure.

The third formulation contained about 0.5% by weight of "IRGACURE" 1700, and the UV transmitting test piece which was exposed to UV radiation for 1 second demonstrated a shear strength of about 1776 psi with adhesive failure; the corresponding UV absorbing test piece assembly was not observed to cure. The UV transmitting test piece which was exposed for 2 seconds demonstrated a shear strength of about 1830 psi with cohesive failure; the corresponding UV absorbing test piece demonstrated a shear strength of about 654 psi also with cohesive failure. The UV transmitting test piece which was exposed to UV radiation for 5 seconds demonstrated a shear strength of about 2064 psi with adhesive and cohesive failure; the corresponding UV absorbing test piece demonstrated a shear strength of about 1904 psi with adhesive and cohesive failure.

The UV transmitting test piece which was exposed to UV radiation for 1 second and thereafter allowed to cure further for 24 hours demonstrated a shear strength of about 3124 psi with adhesive and substrate failure; the corresponding UV absorbing test piece assembly was again observed not to cure. The UV transmitting test piece which was exposed for 2 seconds and allowed to cure further for 24 hours demonstrated a shear strength of about 1830 psi with cohesive failure; the corresponding UV absorbing test piece demonstrated a shear strength of about 2820 psi with adhesive and substrate failure. The UV transmitting test piece which was exposed to UV radiation for 5 seconds and thereafter allowed to cure further for 24 hours demonstrated a shear strength of about 2190 psi with adhesive and cohesive failure; the corresponding UV absorbing test piece demonstrated a shear strength of about 3128 psi with substrate failure.

As a control composition, "PRISM" Adhesive 4061 cyanoacrylate adhesive was also applied to both UV transmitting and UV absorbing test pieces. Exposure of both UV transmitting and UV absorbing test pieces to UV radiation for 5 seconds resulted in shear strength measurements of about 13 psi and 14 psi, respectively. Values of this order of magnitude effectively mean that the composition did not cure. After a period of about 24 hours at ambient temperature conditions, the UV transmitting test piece assembly demonstrated a shear strength of about 1724 psi and the UV absorbing test piece assembly demonstrated a shear strength of about 2624 psi.

Of course, other applications for the formulations of the present invention exist beyond those exemplified above and are contemplated within the scope thereof, including, but not limited to, silk screening or disc applications, bonding together cardboard holding cartridges for batteries, lens bonding applications, bonding of cannula/hub needle assembly for the medical industry, applications where blooming and crazing would be aesthetically unacceptable from a commercial perspective, and other applications where it would be desirable to obviate the need for the use of a primer material or ozone-depleting material in, for instance, the fastening of electronic wire tacking, and the like.

While the present invention has been exemplified as shown above, it is clear that variations are also intended to be within the spirit and scope of the present invention and may be practiced in accordance herewith, with only routine, rather than undue, experimentation. Any variations and equivalents should provide suitable, if not comparable results, when viewed in connection with the results obtained from the above examples. Accordingly, such variations and equivalents are also intended to be encompassed by claims which follow.

What is claimed is:

1. A composition comprising:
    (a) a 2-cyanoacrylate component,
    (b) a metallocene component, and
    (c) a photoinitiator component, selected from the group consisting of 1-hydroxycyclohexyl phenyl ketone, 2-methyl-1-[4-(methylthio)phenyl]-2-morpholino propan-1-one, benzophenone, 2-benzyl-2-N,N-dimethylamino-1-(4-morpholinophenyl)-1-butanone, 2,2-dimethoxy-2-phenyl acetophenone, bis(2,6-dimethoxybenzoyl-2,4-,4-trimethyl pentyl) phosphine oxide, 2-hydroxy-2-methyl-1-phenyl-propan-1-one, 2-hydroxy-2-methyl-1-phenyl-1-propane, 2,4,6-trimethylbenzoyldiphenyl-phosphine oxide, 2-hydroxy 2-methyl-1-phenyl-propan-1-one, mixed triaryl sulfonium hexafluoroantimonate salts, mixed triaryl sulfonium hexafluorophosphate salts, visible light photoinitiators. dl-camphorquinone, and combinations thereof.

2. The composition according to claim 1, which includes a polymerizingly effective amount of the photoinitiator component to render it capable of photocuring upon exposure to electromagnetic radiation.

3. The composition according to claim 2, wherein the source of electromagnetic radiation is selected from the group consisting of ultraviolet light, visible light, electron beam, x-rays, infrared radiation and combinations thereof.

4. The composition according to claim 2, wherein the cyanoacrylate component includes 2-ethyl cyanoacrylate which is present in an amount within the range of about 97.9% by weight to about 99.4% by weight of the total composition, the metallocene component is ferrocene which is present in an amount of about 0.1% by weight of the total composition, and the photoinitiator component includes the combination of
    bis(2,6-dimethoxybenzoyl-2,4-,4-trimethyl pentyl phosphine oxide and
    2-hydroxy-2-methyl-1-phenyl-propan-1-one which is present in an amount in the range of about 0.5% to about 2% by weight of the total composition.

5. A method of polymerizing a photocurable composition, said method comprising the steps of:
    (a) providing an amount of the photocurable composition according to claim 2; and
    (b) subjecting the composition to electromagnetic radiation effective to cure the composition.

6. A reaction product formed from the composition according to claim 2 after exposing the composition to electromagnetic radiation effective to cure the composition.

7. The composition according to claim 1, wherein the cyanoacrylate component includes a cyanoacrylate monomer represented by $H_2C=C(CN)-COOR$, wherein R is selected from the group consisting of $C_{1-15}$ alkyl, alkoxyalkyl, cycloalkyl, alkenyl, aralkyl, aryl, allyl and haloalkyl groups.

8. The composition according to claim 1, wherein the cyanoacrylate monomer is selected from the group consisting of methyl cyanoacrylate, 2-ethyl cyanoacrylate, 2-propyl cyanoacrylate, 2-butyl cyanoacrylate, 2-octyl cyanoacrylate, allyl cyanoacrylate, β-methoxyethyl cyanoacrylate and combinations thereof.

9. The composition according to claim 1, wherein the cyanoacrylate monomer is 2-ethyl cyanoacrylate.

10. The composition according to claim 1, wherein the metallocene component includes materials within the following structure:

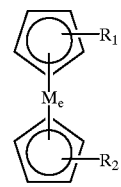

wherein $R_1$ and $R_2$ may be the same or different, and each is a member selected from the group consisting of H; any straight- or branched-chain alkyl constituent having from 1 to about 8 carbon atoms, acetyl; vinyl; allyl; hydroxyl; carboxyl; —$(CH_2)_n$—OH, wherein n may be an integer in the range of 1 to about 8; —$(CH_2)_n$—$COOR_3$, wherein n may be an integer in the range of 1 to about 8 and $R_3$ may be any straight- or branched-chain alkyl constituent having from 1 to about 8 carbon atoms, H, Li, Na, or —$(CH_2)_{n'}$, wherein n' may be an integer in the range of 2 to about 8; —$(CH_2)_n$—$OR_4$, wherein n may be an integer in the range of 1 to about 8 and $R_4$ may be any straight- or branched-chain alkyl constituent having from 1 to about 8 carbon atoms; and —$(CH_2)_n$—$N^+(CH_3)_3$ $X^-$, wherein n may be an integer in the range of 1 to about 8 and X is a member selected from the group consisting of $Cl^-$, $Br^-$, $I^-$, $ClO_4^-$ and $BF_4^-$; and $M_e$ is a member selected from the group consisting of Fe, Ti, Ru, Co, Ni, Cr, Zr, Hf and Mo.

11. The composition according to claim 1, wherein the metallocene component is selected from the group of metallocene consisting of ferrocenes, titanocenes, and derivatives and combinations thereof.

12. The composition according to claim 1, wherein the metallocene is ferrocene.

13. The composition according to claim 1, wherein the photoinitiator is initiated by radiation in the visible region of the electromagnetic spectrum.

14. The composition according to claim 1, wherein the composition is useful as a sealant, an adhesive or a coating.

15. The composition according to claim 1, reaction products of which demonstrate reduced blooming and crazing.

16. The composition according to claim 1 in a one-part formulation.

17. A method of using the composition according to claim 1, said method comprising the steps of:

applying the composition according to claim 1 onto a surface of a substrate; and subjecting the composition-applied substrate to radiation in the electromagnetic spectrum.

18. The method according to claim 17, wherein prior to subjecting the composition-applied substrate to radiation in electromagnetic spectrum, a second substrate is mated with the composition-applied substrate.

19. The method according to claim 18, wherein at least one of the first substrate or the second substrate is constructed of an ultraviolet transmitting material.

20. A method of reducing blooming or crazing when curing cyanoacrylate-containing compositions, said method comprising the steps of:

applying the composition according to claim 1, onto a surface of a substrate; and subjecting the composition-applied substrate to radiation in the electromagnetic spectrum.

* * * * *

Disclaimer

5,922,783—Stan Wojciak, New Britian, Conn. RADIATION-CURABLE, CYANOACRYLATE-CONTAINING COMPOSITIONS. Patent dated July 13, 1999. Disclaimer filed November 2, 2001 by the assignee, Loctite Corporation.

Hereby enters this disclaimer to claims 1-3 and 5-20 of said patent.

*(Official Gazette, August 27, 2002)*